(12) United States Patent
Law et al.

(10) Patent No.: US 7,786,998 B2
(45) Date of Patent: Aug. 31, 2010

(54) METHODS AND APPARATUS FOR CONTROLLING VIDEO PLAYBACK

(75) Inventors: Henry Law, Toronto (CA); Kenneth Man, North York (CA)

(73) Assignee: ATI Technologies ULC, Markham, Ontario (CA)

( * ) Notice: Subject to any disclaimer, the term of this patent is extended or adjusted under 35 U.S.C. 154(b) by 1553 days.

(21) Appl. No.: 10/987,397

(22) Filed: Nov. 12, 2004

(65) Prior Publication Data
US 2006/0104599 A1    May 18, 2006

(51) Int. Cl.
*G09G 5/39* (2006.01)
(52) U.S. Cl. ............... 345/531; 345/502; 345/522; 345/530; 345/536; 345/539; 386/46
(58) Field of Classification Search ......... 345/530–574, 345/502, 522; 386/46
See application file for complete search history.

(56) References Cited

U.S. PATENT DOCUMENTS

| | | | | |
|---|---|---|---|---|
| 5,933,155 A | * | 8/1999 | Akeley | 345/536 |
| 6,100,906 A | * | 8/2000 | Asaro et al. | 345/539 |
| 6,614,441 B1 | * | 9/2003 | Jiang et al. | 345/539 |
| 6,747,654 B1 | * | 6/2004 | Laksono et al. | 345/502 |
| 7,421,694 B2 | * | 9/2008 | Gosalia et al. | 718/104 |

* cited by examiner

*Primary Examiner*—Kimbinh T Nguyen
(74) *Attorney, Agent, or Firm*—Vedder Price P.C.

(57) ABSTRACT

The present disclosure discusses methods and apparatus for controlling the video playback in a video playback system. In particular, a method for controlling video playback includes receiving a flip call to display video data from a flip queue buffer. Processing of the video data is then initiated. Flip acknowledgement information is issued in response to receiving the flip call information and prior to completion of the processing of video data to be displayed from the flip queue buffer. By issuing flip acknowledgement information regardless of whether the processing of the video data has been completed, video flip calls can continue to be issued at a constant rate and other processing can continue without waiting, thus resulting in better and smoother video playback and economizing processing resources. Additionally, a decision whether or not to drop a particular video frame is made based on whether a flip queue buffer from a predetermined number of flip queue buffers is available. The disclosed apparatus includes a flip manager, such as under the control of a driver, that controls the timing of video frame flips, rather than an application controlling the timing.

24 Claims, 6 Drawing Sheets

US 7,786,998 B2

METHODS AND APPARATUS FOR CONTROLLING VIDEO PLAYBACK

FIELD OF THE INVENTION

The present disclosure relates to methods and apparatus for controlling video playback and, more particularly to methods and apparatus, for controlling video buffer flip timing to display video from flip buffers.

BACKGROUND OF THE INVENTION

Control of video playback in video playback devices such as computers, set top boxes, hand held devices, and any other suitable video playback device, for example, is typically performed by a video driver (e.g., a software module), which may be called upon by an application (e.g., a software application) both being run by a processor, such as a central processing unit (CPU) in the computer to play video data. Video as used herein includes video and/or graphics data or any visual data stored in a display memory for display on a display medium whether a display screen or paper or other medium. Additionally, the software application will call the driver to direct video data processing by a video graphics processor or other devices, prior to playback. Such applications calling video playback use timing information from the display device (e.g., a current vertical line (VLINE)) displaying the video content to determine when hardware (e.g., the video graphics processor) is able to display a particular video frame of a video sequence. Typically, changing one video frame to a next video frame or "flipping" a sequence of frames for video playback occurs during a VBLANK (vertical blanking interval) or VSYNC (vertical synchronization) time period signifying the frame of video information has been displayed.

Applications, however, do not typically receive display timing data, such as the VBLANK or VSYNC timing information. Thus, without such information, a decision by the application to command a flip of a video frame may not occur with enough precision to synchronize or calibrate the video frame rate with the display frame rate of a display screen (e.g., the refresh rate). This lack of precision may arise due to variations of the display screen's refresh rate and other display properties. In essence, when a video playback application has discretion to calibrate the video playback, typically the application will end up making wrong decisions concerning calibration of flip calls to the display frame rate resulting in video frames being dropped repeatedly in an unpredictable fashion. As a result, the video playback has jitter and tearing and the video quality shown on the actual physical display medium becomes poor. Additionally, because the application, which is running on the CPU, is directing video playback timing, the application often has to wait for video information to be processed and displayed before proceeding with another flip call. This waiting takes up valuable processing resources of the CPU.

BRIEF DESCRIPTION OF THE DRAWINGS

The presently disclosed apparatus and methods will be more readily understood in view of the following description when accompanied by the figures described below and wherein like reference numerals represent like elements.

DETAILED DESCRIPTION OF THE PRESENT EMBODIMENTS

The present disclosure discusses methods and apparatus for controlling the video playback in a video playback system. In particular, a disclosed method for controlling video playback includes receiving a flip call to display video data from a flip queue buffer. Processing of the video data is then initiated. Flip acknowledgement information is issued in response to receiving the flip call information and is issued prior to completion of the processing of video data to be displayed from the flip queue buffer. By issuing flip acknowledgement information regardless of whether the processing of the video data has been completed, video flip calls can continue to be issued at a constant rate and other processing can continue without waiting, thus resulting in better and smoother video playback and economizing processing resources. Additionally, a decision whether or not to drop a particular video frame is made based on whether a flip queue buffer from a predetermined number of flip queue buffers is available.

The present disclosure also discusses video flip timing controlled by a video frame flip manager responsive to an interrupt signal based on either VSYNC or VBLANK information, as examples. One of ordinary skill in the art could also contemplate using horizontal sync information (VLINE) on which to base the interrupt. The video frame flip manager is configured to control the decision and timing to flip a video frame, rather than the video application directing decision-making and timing.

Figure 1:
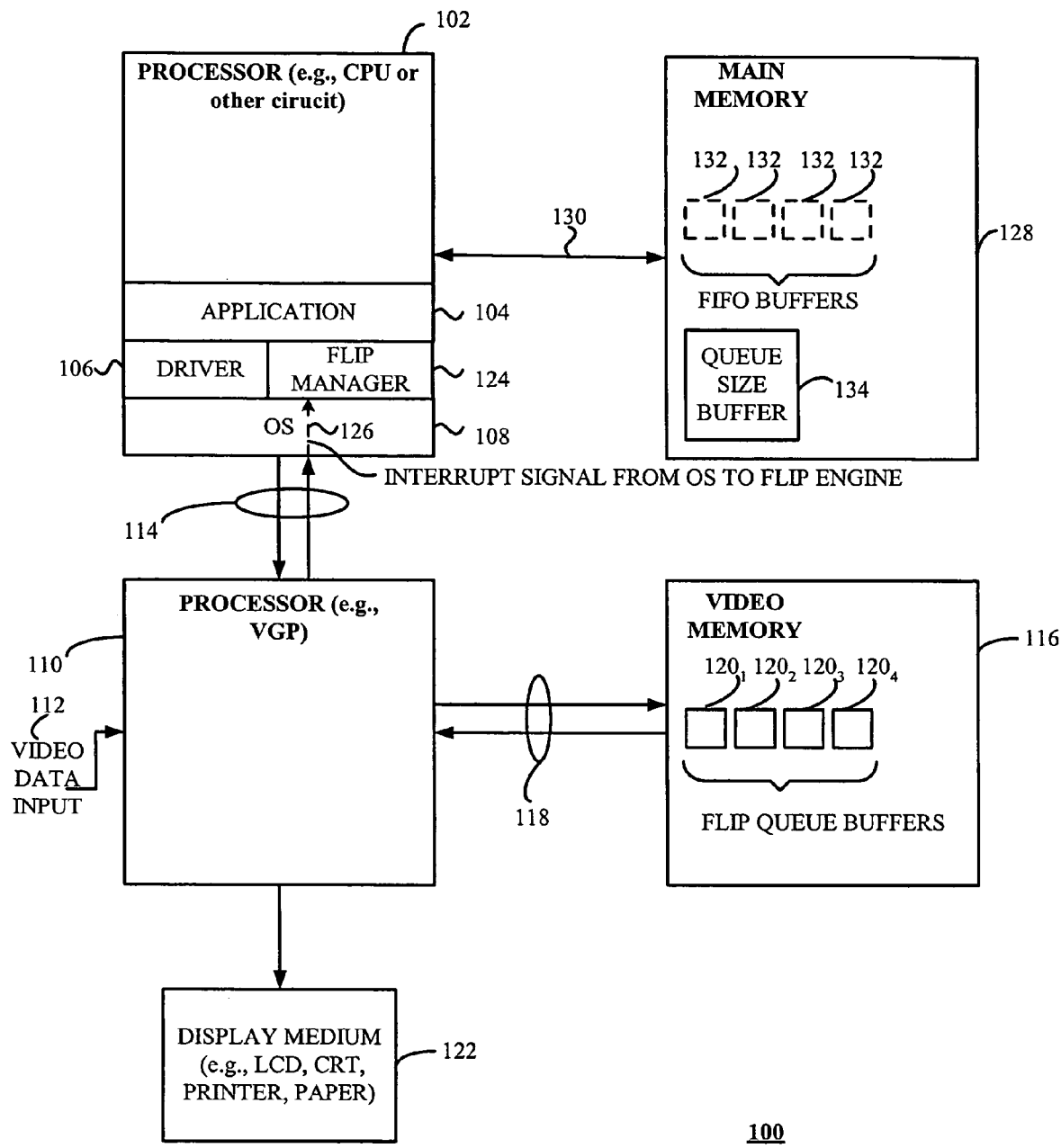
FIG. 1 illustrates one example of a system in accordance with the present disclosure.

As illustrated in FIG. 1, a video playback system such as a computing system 100 is illustrated including a processor such as central processing unit 102, which is configured to run a particular application 104. The application, which may be software, hardware or firmware, issues flip calls for a driver 106 in conjunction with an operating system 108 to display video information or data. The driver 106 which may be a software program executing on the CPU 102 directs or drives a video graphics processor 110 to effect display of video data 112 input into the video graphics processor 110. It is noted that the CPU 102 and video graphics processor 110 are shown separately having a bus 114 communicating information and data between the two devices. One of ordinary skill in the art will appreciate, however, that the CPU 102 and video graphics processor 110 could be incorporated in one chip package in the alternative or that the functionality described herein may be carried out by any suitable structure.

The computing system 100 also includes a video memory 116 for the purpose of storing video data that has been processed and ready for display by the video graphics processor 110. The video graphics processor 110 and the video memory 116 communicate and exchange adding information, contains information and data via a bus 118 as known in the art. The video memory 116 contains one or more flip queue buffers $120_1$-$120_4$ used to temporarily hold video data frames while awaiting display on a display medium 122 (e.g. display screen) connected to the video graphics processor 110. As will be explained later, this flip queue buffers 120 are allocated by the driver 106 when a video playback is initiated by the application 104 and are de-allocated at the conclusion of the video playback. Thus, the buffers 120 are, in a sense, temporal for the period of time required for a particular video playback. It is also noted that the display medium 122 may include any various electronic display devices such as an LCD screen or a CRT. The display medium, however, may also be contemplated to include print media such as a printer device or even paper on which the video data may be printed.

Within the driver 106, the presently disclosed system 100 also includes a flip manager 124, which may be executable instructions run in the CPU 102 as part of the driver 106. The purpose of the flip manager 124 is to effect timing of the video data read out of the flip queue buffers 120 and displayed by the video graphics processor 110 on the display medium 122. The use of such flip manager 124 allows control over the timing of the video playback, which was previously performed by an application in conventional systems as was previously discussed in the Background of this disclosure. In particular, the flip manager 124 is configured to be responsive to an interrupt signal received from the video graphics processor 110 over bus 114 and via the operating system 108 as indicated by dashed line 126. The function and operation of the flip manager 124 and its response to the interrupt signal 126 will be discussed in further detail later in this application.

The system 100 also includes a main memory 128 connected to the CPU 102 via a communication bus 130. The presently disclosed methods and apparatus utilize the main memory 128 for, among other things, bookkeeping functions such as FIFO buffers 132, which are used by the driver 106 to keep track of the sequential ordering of information stored in the flip queue buffers 120 in the video memory 116.

Figure 2:
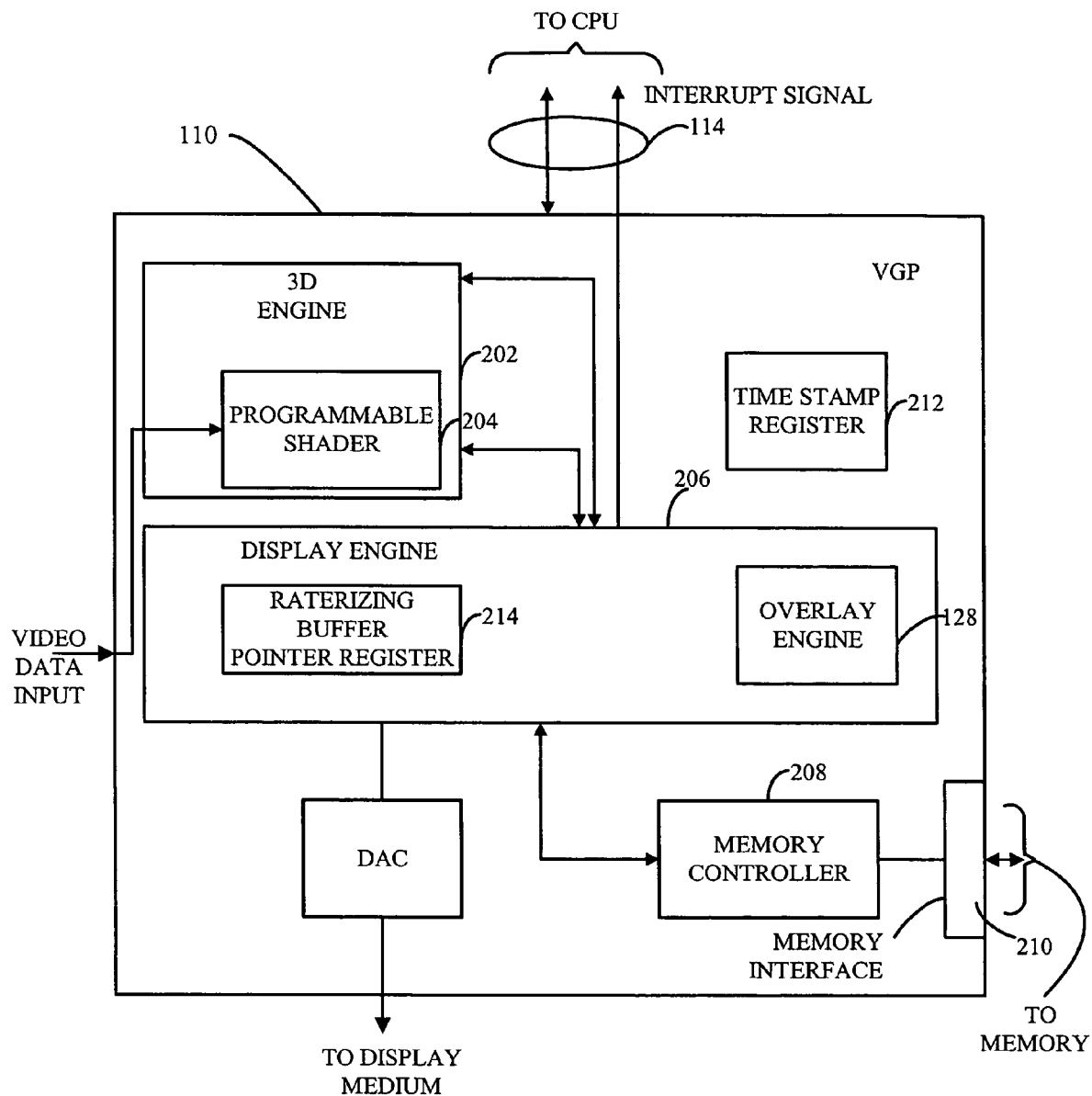
FIG. 2 illustrates one example of a functional block diagram of a processor configured in accordance with the present disclosure.

FIG. 2 illustrates an exemplary block diagram of the video graphics processor 112 utilized in the system 100 shown in FIG. 1. The video graphics processor 110 includes a 3D engine 202 that contains a programmable shader 204 for processing input video data. This 3D engine and shader may be of a type found in the ATI Radeon® Series 9800 graphics device available from ATI Technologies, Inc. of Markham, Ontario, Canada, or any other suitable device. It is noted that although the presently disclosed methods and apparatus utilize the programmable shader 204 to perform processing, such as video filtering, any suitable programmable portion of the video graphics processor 110 may be used to perform this function. A display engine 206 is included for performing functions related to displaying the video information to the display medium 122, sending data to the memory controller 208, which in turn sends the frames to the queue buffers in the memory via a memory interface 210. The video graphics processor 110 also includes a time stamp register 212 that is used to store information concerning whether or not the programmable shader 204 has completed a filtering operation of a particular video frame. Also included within the display engine 206, is a rasterizing buffer pointer register 214. This register 214 is used to point to which of the flip queue buffers 120 will be read from next in sequence to display.

In operation, the apparatus illustrated in FIGS. 1 and 2 serves to control video playback such that the resources of the CPU needed for playing back video may be reduced, thereby freeing up resources in the CPU to be used by other applications, for example. In particular, the use of a flip manager, such as flip manager 124, within the driver 106, allows an application, such as application 104 to not have to control video playback timing or wait for the video graphics processor 110 to process the video data. Additionally, the flip manager 124 according to the present disclosure is configured to be free of any looping that would cause delays or increase the processing time of the CPU 102. FIGS. 3-6, which will be described below, illustrate the operation of system 100 and how the control of video playback or "flipping" is accomplished.

Figure 3:
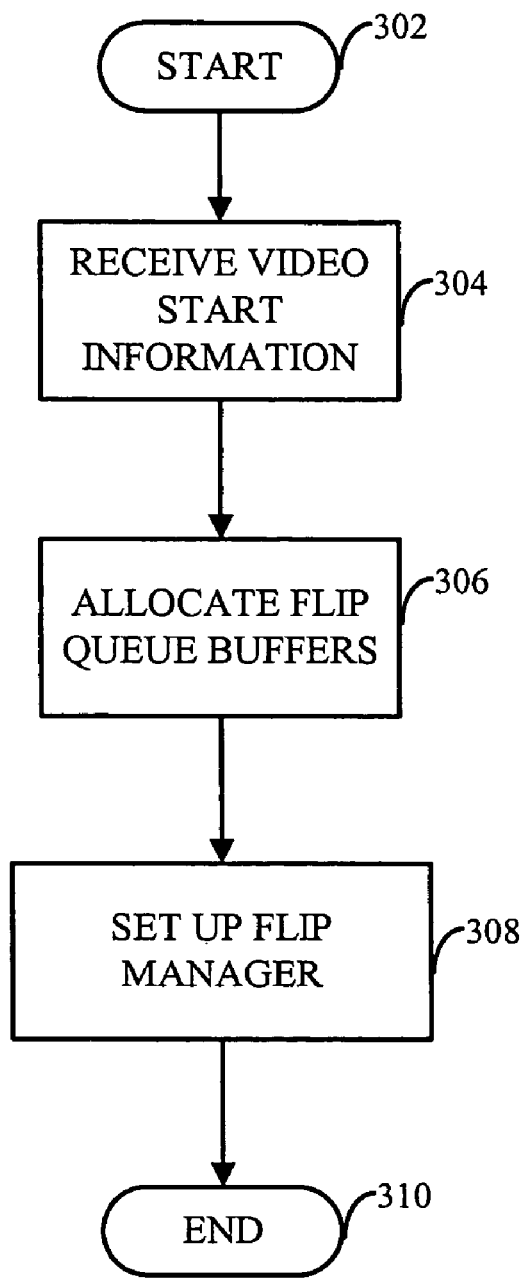
FIG. 3 illustrates one example of a flow diagram of an initialization process for the driver illustrated in FIG.

FIG. 3 illustrates a flow diagram 300 of an operation performed when an application, such as application 104, requires or calls for video playback. At a start block 302, the application 104 calls for video playback. As an example, the application could be calling DVD video information to be displayed in an overlay on a display device, such as a CRT. After initialization, the application 104 sends video start information to the driver 106 as indicated in block 304 where the video start information is shown to be received by the driver 106. Next, the driver 106 allocates particular flip queue buffers within the video memory 116 that will be used for storing processed video frames during playback. In particular, the information concerning the flip queue buffers 120 is received by the driver 106 from the operating system 108. The operating system 108 receives the information via bus 114 from the display engine 206, for example, which receives memory information from the memory controller 208.

The driver 106 then sets up the flip manager 124 as indicated in block 308. The initialization then ends at block 310. Once the flip queue buffers have been allocated and the flip manager 124 is set up, the driver 106 is ready to receive flip call information from the application 104. In particular, the flip manager 104 is configured such that it will be called upon to perform video timing control every time an interrupt signal (e.g., signal 126) is received. This signal is, for example, issued by the display engine 206 based on either the occurrence of a VSYNC or VBLANK time period.

Figure 4:
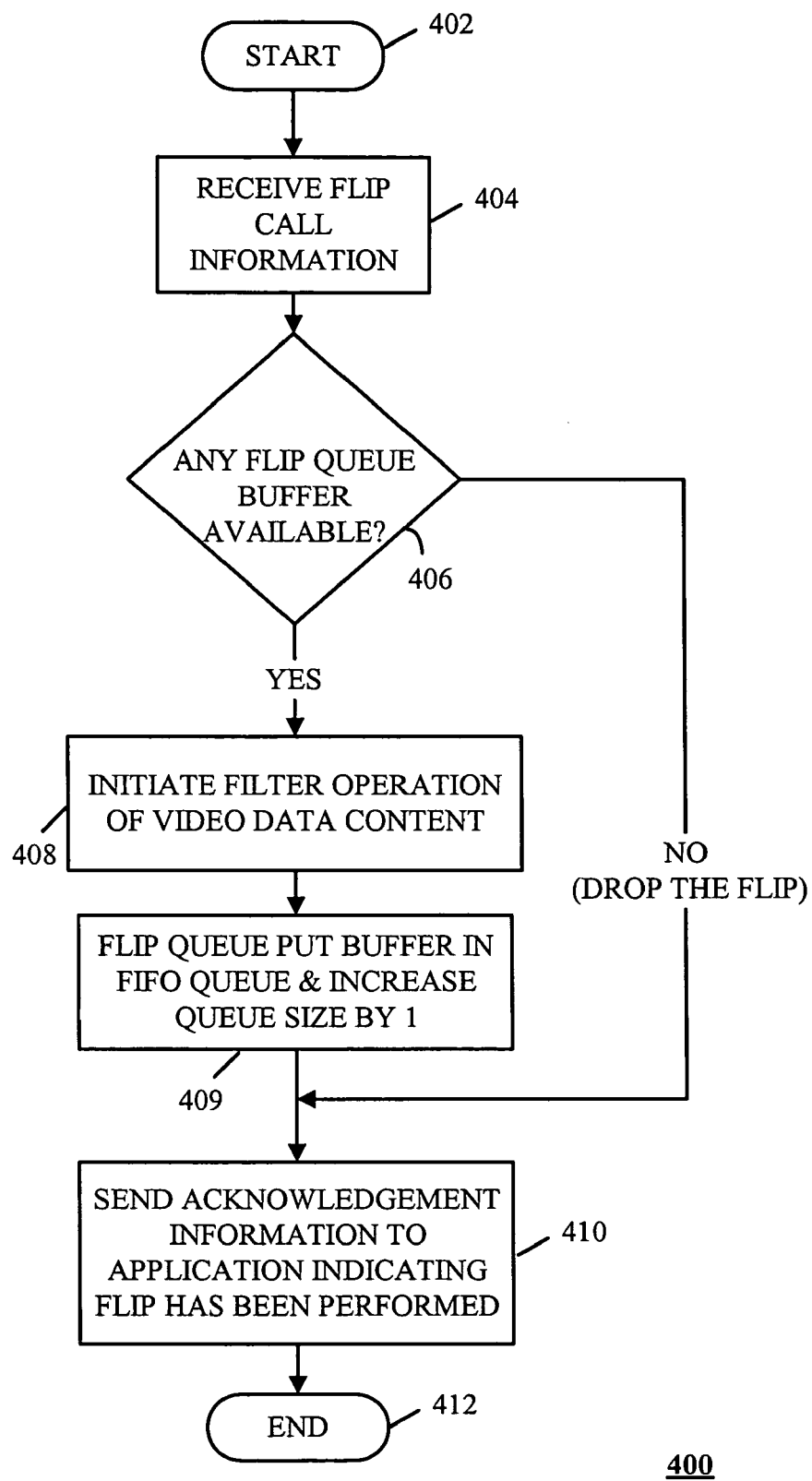
FIG. 4 illustrates one example of a flow diagram of a video playback sequence in accordance with the present disclosure.

The operation of the driver, in conjunction with the video graphics processor 110 during the video playback by a flip request is illustrated in FIG. 4. As illustrated, a flow diagram 400 begins at an initialization start 402. At block 404, the driver 106 (e.g. the portion of the CPU executing the driver code) receives flip call information from the application 104 (e.g. the portion of the CPU executing the application) to show a particular video frame of the video data on the display medium as indicated at block 404. The driver 106 then checks to determine if any flip queue buffers are available in the video memory 116 as indicated in decision block 406. This check may be accomplished through the operating system 108 polling information from the video graphics processor 110 or, in the alternative, from a virtual memory within the main memory 128 that tracks the flip queue buffers 120. If no queue buffers are available, the driver 106 drops the flip and proceeds directly to block 410 where acknowledgement information is sent by the driver 106 to the application 104 indicating that a flip has been performed (e.g., a "FLIP_OK" acknowledgement). If the decision at 406 is in the negative, this indicates that processing of video data has most likely been delayed or taken excessive time, thus the flip queue buffers are still storing information. Thus, the driver 106 proceeds to acknowledge a flip to the application 104 in order to prevent the application from waiting any further and also to allow the process illustrated in FIG. 4 within the driver 106 to conclude quickly in order that CPU resources used by the driver 106 are also minimized.

If, however, at block 406 a queue buffer is available, the driver 106 will then initiate filtering operation of the video data content by the video graphics processor 110. This operation is indicated at block 408 and starts the processing within the programmable shader 204, in particular. After block 408, flow proceeds to block 409 where the driver 106 directs that the particular flip queue buffer location be stored in a FIFO queue buffer 132 within the main memory 128. The purpose of the FIFO queue buffer 132 is to ensure that those video frames written to memory in the flip queue buffer first will be the first read out of the video memory to ensure that the video frames are displayed in the order in which they are received at the video data input 112. Additionally, a queue size buffer 134 is then incremented by an integer value of 1 in order to keep a count of how many flip buffer queues are presently storing filtered video data information.

The flow then proceeds to block 410 where the driver 106 sends acknowledgment information to the application 104 indicating that the flip has been performed as shown in block 410. It is noted, however, that typically when the acknowledgement information is sent by the driver 106 to the application 104, the processing or filtering operation of the video data within the video graphics processor is still ongoing. Thus, the operation illustrated in FIG. 4 allows processing of the video information to begin while quickly sending an acknowledgement to the application 104 in order to prevent any further waiting or processing time by the application concerning the video flip timing. Also, the process of FIG. 4 is performed quickly in very few clock cycles of the CPU in order to minimize the processing resources of the CPU 102 taken up by the driver 106. The provision of the acknowledgment signal to the application 104 also ensures that the application 104 continues to send subsequent flip calls without delay or any change in the application's timing.

Figure 5:
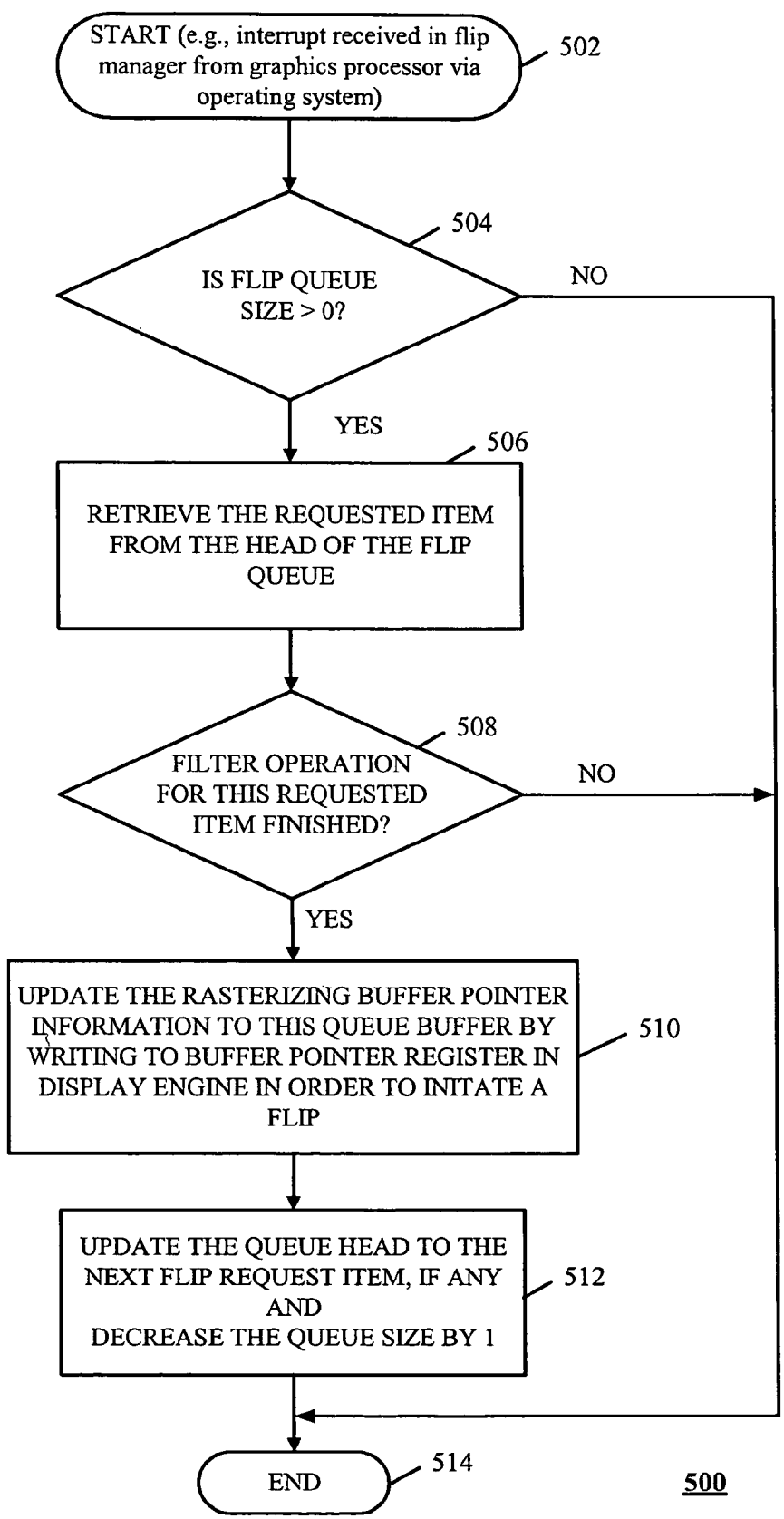
FIG. 5 illustrates one example of a flow diagram of a video data processing and timing in accordance with the present disclosure.

FIG. 5 illustrates the procedure by which the flip manager 124 controls the timing of video frames being displayed by the video graphics processor 110. The procedure 500 illustrated in FIG. 5 is always started or initialized by the interrupt signal 126 issued from the display engine 206 in the video graphics unit 110. As briefly explained above, the interrupt signal is a general interrupt programmed into the functionality of the display engine 206 where the interrupt signal is issued every time a VSYNC or VBLANK time period occurs (indicating that a video frame has been displayed on the display medium 122). Also as explained previously, the interrupt signal is received within the flip manager 124 via the operating system 126 that interfaces by a bus 114 with the video graphics processor 110. This process is illustrated in block 502 in FIG. 5. The flow proceeds then to decision block 504 where the flip manager 126 determines if the flip queue size is greater than zero. In order to accomplish this check, the flow manager 124 accesses the queue size buffer 134 in the main memory 128 through the operating system 108. The check performed in block 504 is, in other words, determining whether there is currently pending video frame information within the flip queue buffers 120 that needs to be displayed. If none of the flip queue buffers contains video data, flow simply proceeds to the end 514. Alternatively, if the flip queue size as determined by polling the flip queue size buffer 134 is greater than zero, flow proceeds to block 506.

In block 506, the flip manager 124 retrieves information about a requested item from the head of the flip queue. This is, the flip manager 124 accesses the virtual memory within the main memory 128 to determine which video data is at the "head" or the very next video frame that is to be displayed. The flow then proceeds to decision block 508 where the flip manager 124 via the operating system 126 determines if the filtering operation performed by the programmable shader 204 has been finished. In order to check this information, the flip manager 124 via the operating system 126 and bus 114 polls the time stamp register 212 within the video graphics processor 110. In particular, the time stamp register contains the information set by the graphics processor display engine, which is set when the filtering operation for the particular video frame is completed. As shown in FIG. 5, if the filter operation has not been finished, the flow proceeds to the end block 514 in order to ensure that the processing time taken by the flip manager 124 is minimized, rather than a loop waiting for the filter operation to complete. If, on the other hand, the filter operation has been completed as determined in block 508, flow proceeds to block 510 where the rasterizing buffer pointer register 214 within the display engine is updated to the particular queue buffer of the video data frame by writing to the buffer pointer register 214 in the display engine 206. This is accomplished by the flip manager 124 via the operating system 124 and bus 114. Once the rasterizing buffer pointer information points to the particular queue buffer 120, the video frame data will then be displayed upon occurrence of a VSYNC or VBLANK signal in the display engine 206 as indicated in block 510.

Flow then proceeds to block 512 where the queue head is updated to a next flip request item, if any next flip item exists, and decreases the queue size buffer within the main memory 128 by a value of 1. The flow then proceeds to end at block 514.

It is noted that in block 508 if a filtering operation is still being performed on a particular video data frame, the flip manager 124, rather than waiting, proceeds to end block 514. In doing so, the manager 124 then schedules the flip queue buffer that is at the head of the flip queue to be read out and displayed after the next occurrence of VSYNC or VBLANK.

Filtering of the video data by the programmable shader 204 may include, but is not limited to, scaling of the video data, color rendering, interlacing and de-interlacing, color space conversion, frame rate conversion or may simply consist of copying the data straight to the flip queue buffer 120. It is noted that this list is merely exemplary and not exhaustive and that any known type of video processing or filtering may be accomplished in the filtering initiated in block 408.

Figure 6:
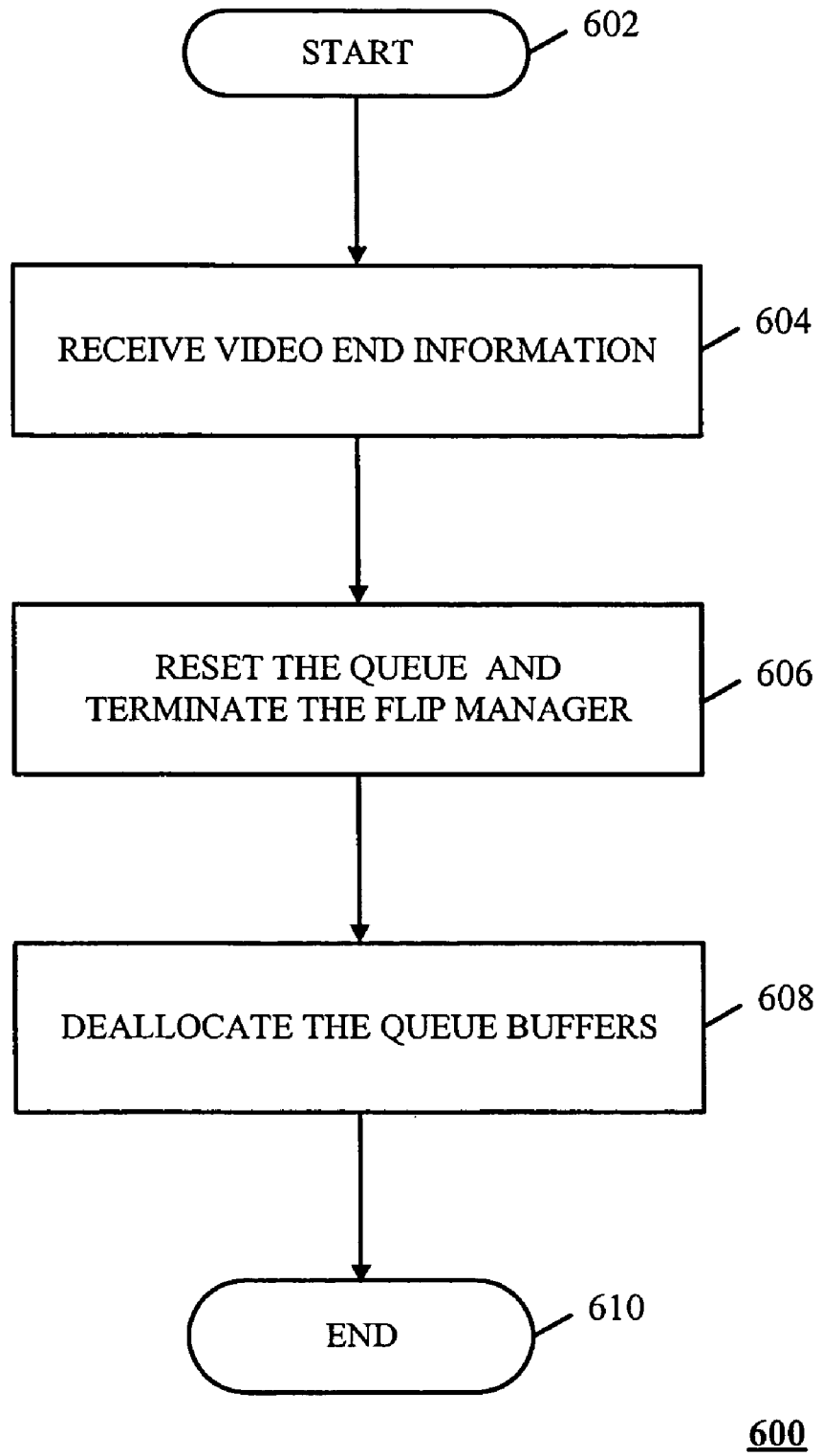
FIG. 6 illustrates one example of a finalization process carried out at the end of a video playback I accordance with the present disclosure.

FIG. 6 illustrates the process performed by the driver 106 when the application 104 is no longer requesting flip call or video affirmation to be displayed. As shown in flow diagram 600, the initialization of the termination routine starts at block 602. Next, the driver 106 receives video end information from the application 104 as indicated in block 604. The queue buffers are reset such that flip queue size becomes zero and the driver 106 terminates the flip manager 124 as indicated in block 606. The driver 106 then de-allocates the flip queue buffers 120, which were previously allocated in the video memory 116 in order to allow these memory locations to be used for other storage purposes. The driver then ends the termination routine at block 610 in order to free up resources of the central processing unit 102.

As described, the disclosed methods and apparatus afford better and smoother playback of video data and economize processing resources. This is accomplished by, among other things, providing flip acknowledgment information to an application prior to completion of video processing or, if no buffer is available to hold the video data, immediately after the flip is dropped, thus preventing the application from waiting for information concerning the video display. Additionally, the use of flip manager in a driver response to an interrupt signal from the graphic processor, allows the flip manager to control timing of the video frame flipping, while minimizing systems resources being used by the manager in the CPU.

It is noted that the methods described herein may be carried out by a processor executing stored executable instructions in one or more memory devices that, when processed by a processor, perform the methods. It is also noted that the term "processor" used herein, may include one or more digital processing devices or may include state machines or any suitable combination of hardware, software or frame as any suitable structure.

The above detailed description of the examples described therein have been presented for the purposes of illustration and description only and not by limitation. It is therefore contemplated that the present application cover any and all modifications, variations or equivalent the fall within the spirit and scope of the basic underlying principles disclosed above and the appended claims.

What is claimed is:

1. A method for controlling video playback comprising:
receiving a flip call to display video data from a flip queue buffer;
initiating processing of the video data; and
issuing flip acknowledgement information in response to receiving the flip call information and prior to completion of the processing of video data to be displayed from the flip queue buffer.

2. The method as defined in claim 1, further comprising:
receiving interrupt information; and
controlling whether to invoke a flip queue buffer operation to display the video data.

3. The method as defined in claim 2, wherein processing the video data comprises video filtering including at least one of scaling, color rendering, de-interlacing, color space conversion, frame rate conversion of the at least one video data, and copying data to display buffer.

4. A method for controlling video playback comprising:
receiving, from an application executable by a processor, a flip call to display video data from a flip queue buffer, wherein the flip call is received by a driver, which is executable by the processor;
initiating, by the driver, processing of the video data to be performed in a graphics processor; and
issuing flip acknowledgement information from the driver to the application in response to receiving the flip call information and prior to completion of the processing of video data to be displayed from the flip queue buffer.

5. The method as defined in claim 4, further comprising controlling, with a flip manager, whether to invoke a display buffer flip operation to display the video data, wherein the flip manager is responsive to an interrupt signal from the graphics processor.

6. The method as defined in claim 5, wherein controlling whether to invoke a display buffer flip operation further comprises:
determining whether at least one flip queue buffer is storing at least one video frame of the video data;
determining if processing of the at least one video frame is finished when at least one flip queue buffer is storing the at least one video frame;
delaying initiation of a flip when processing of the at least one video frame is not finished; and
initiating a flip when processing of the at least one video frame is finished.

7. The method as defined in claim 5, wherein the interrupt information is based on one of a vertical blanking interval signal, a vertical refresh synchronization signal and a horizontal VLINE signal.

8. The method as defined in claim 4, wherein processing comprises filtering the at least one video frame through at least one of scaling, color rendering, de-interlacing, color space conversion, frame rate conversion of the at least one video data, and copying data to display buffer.

9. The method as defined in claim 4, further comprising:
determining whether a flip queue buffer is available to store at least one video frame of the video data; and
dropping the flip call when no flip queue buffer is available.

10. A computer-readable medium comprising:
executable instructions such that when processed by at least one processor, the executable instructions cause the at least one processor to:
receive a flip call to display video data from a flip queue buffer;
initiate processing of the video data; and
issue flip acknowledgement information in response to receiving the flip call information and prior to completion of the processing of video data to be displayed from the flip queue buffer.

11. The computer-readable medium as defined in claim 10, wherein the executable instructions, when processed by the at least one processor, further cause the at least one processor to receive interrupt information and to control whether to invoke a flip queue buffer operation to display the video data.

12. The computer-readable medium as defined in claim 10, wherein the executable instructions, when processed by the at least one processor, further cause the at least one processor to control whether to invoke a display buffer flip operation in response to an interrupt signal from the graphics processor.

13. The computer-readable medium as defined in claim 12, wherein the executable instructions, when processed by the at least one processor, further cause the at least one processor to control whether to invoke a display buffer flip operation by:
determining whether at least one flip queue buffer is storing at least one video frame of the video data;
determining if processing of the at least one video frame is finished when at least one flip queue buffer is storing the at least one video frame;
delaying initiation of a flip when processing of the at least one video frame is not finished; and
initiating the display buffer flip operation when processing of the at least one video frame is finished.

14. A system for video playback comprising:
a processor; and
memory operatively coupled to the processor and containing executable instructions such that when processed by the processor, the executable instructions cause the processor to:
receive a flip call to display video data from a flip queue buffer;
initiate processing of the video data; and
issue flip acknowledgement information in response to receiving the flip call information and prior to completion of the processing of video data to be displayed from the flip queue buffer.

15. The system as defined in claim 14, wherein the executable instructions, when processed by the processor, further cause the processor to receive interrupt information and to control whether to invoke a flip queue buffer operation to display the video data.

16. The system as defined in claim 14, wherein the executable instructions, when processed by the processor, further cause the processor to control whether to invoke a display buffer flip operation in response to an interrupt signal from the graphics processor.

17. The system as defined in claim 16, wherein the executable instructions, when processed by the processor, further cause the processor to control whether to invoke a display buffer flip operation by:
determining whether at least one flip queue buffer is storing at least one video frame of the video data;

determining if processing of the at least one video frame is finished when at least one flip queue buffer is storing the at least one video frame;

delaying initiation of a flip when processing of the at least one video frame is not finished; and initiating the display buffer flip operation when processing of the at least one video frame is finished.

18. A method for controlling video playback comprising:

receiving a flip call from an application wherein the flip call is an instruction to display video data on an associated display medium, wherein the application is executed by at least one processor;

initiating processing of the video data in response to the flip call;

determining that the video data processing is finished; and invoking a flip queue buffer operation to display the video data from a flip queue buffer based on an interrupt signal associated with the display medium, without using the application.

19. The method of claim 18, further comprising:

storing the location of the particular flip queue buffer in an ordering buffer; and providing the stored location of the particular flip queue buffer for display of the video data.

20. The method of claim 18, further comprising issuing flip acknowledgement information in response to receiving the flip call information, during the processing of the video data and prior to completion of the processing of the video data.

21. The method of claim 18, wherein the interrupt signal represents a vertical synch, vertical blanking or horizontal synch interval of the display medium.

22. A computer-readable medium comprising executable instructions, wherein the executable instructions are capable of being executed by at least one processor and wherein a first portion of the executable instructions represents an application and wherein a second portion of the executable instructions represents a driver, and wherein:

when the first portion of the executable instructions is executed by the at least one processor, the at least one processor issues a flip call to display video on an associated display medium, and when the second portion of the executable instructions is executed by the at least one processor, the at least one processor:

initiates processing of the video data;

determines that the video data processing is finished; and invokes a flip queue buffer operation to display the video data from a flip queue buffer based on an interrupt signal associated with the display medium.

23. The computer-readable medium of claim 22, wherein when the second portion of the executable instructions is executed by the at least one processor, the at least one processor issues flip acknowledgement information in response to receiving the flip call information, during the processing of the video data and prior to completion of the processing of the video data.

24. The computer-readable medium of claim 22, wherein the interrupt signal represents a vertical synch, vertical blanking or horizontal synch interval of the display medium.

* * * * *